(12) United States Patent
Edmond et al.

(10) Patent No.: US 8,506,138 B2
(45) Date of Patent: Aug. 13, 2013

(54) AIRCRAFT LIGHTING DEVICE

(75) Inventors: George Edmond, Yatton (GB); Thomas Monaghan, Croydon (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/345,892

(22) Filed: Jan. 9, 2012

(65) Prior Publication Data

US 2012/0195056 A1 Aug. 2, 2012

(51) Int. Cl.
*F21V 33/00* (2006.01)
(52) U.S. Cl.
USPC .......................................................... 362/470
(58) Field of Classification Search
USPC .......................................................... 362/470
See application file for complete search history.

(56) References Cited

U.S. PATENT DOCUMENTS

| | | | | |
|---|---|---|---|---|
| 2,375,075 A * | 5/1945 | Carruth | ........................ | 362/470 |
| 2,571,158 A * | 10/1951 | Orlansky | ...................... | 362/470 |
| 2,636,697 A * | 4/1953 | Denny | .......................... | 244/1 R |
| 2,881,307 A * | 4/1959 | Adler, Jr. | ....................... | 362/470 |
| 3,255,343 A * | 6/1966 | Kloss | ............................. | 362/470 |
| 4,380,788 A * | 4/1983 | Korski | ........................... | 362/470 |
| 5,057,833 A * | 10/1991 | Carlson | ......................... | 340/961 |
| 7,025,484 B2 * | 4/2006 | Bushell et al. | ................ | 362/545 |
| 2005/0213342 A1 | 9/2005 | Tufte | | |
| 2011/0299293 A1 * | 12/2011 | Stout et al. | .................... | 362/470 |

FOREIGN PATENT DOCUMENTS

| | | |
|---|---|---|
| DE | 510162 C | 12/1932 |
| SE | 0701198 A | 9/2008 |
| WO | 2010025490 A1 | 3/2010 |

OTHER PUBLICATIONS

Search Report of GB 1101437.0 dated May 20, 2011.

* cited by examiner

*Primary Examiner* — Laura Tso

(74) *Attorney, Agent, or Firm* — Lowe Hauptman Ham & Berner, LLP

(57) ABSTRACT

An aircraft wingtip device comprises illumination means arranged to project light onto interior and exterior surfaces of the wingtip device.

12 Claims, 4 Drawing Sheets

AIRCRAFT LIGHTING DEVICE

RELATED APPLICATIONS

The present application is based on, and claims priority from, British Application Number 1101437.0, filed Jan. 27, 2011, the disclosure of which is hereby incorporated by reference herein in its entirety.

CROSS-REFERENCES TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention is concerned with an aircraft lighting device. More specifically, the present invention is concerned with an aircraft wingtip device and associated lighting arrangement for illumination of the inward and/or outward faces of the wingtip device.

2. Description of the Related Art Including Information Disclosed Under 37 CFR 1.97 and 1.98

Wingtip devices are becoming increasingly common on commercial aircraft. Aside from the reduction of lift induced drag caused by wingtip vortices, wingtip devices also offer a vertically oriented area of the aircraft on which to place advertising and logos which are visible by both the passengers (on the fuselage facing, or inward, side) and by third parties (on the opposite, or outward, side).

It is generally desirable to illuminate the surfaces of the wingtip device in poorly lit conditions, to improve visibility for passengers and passers-by.

Because wingtip devices are often designed into existing airframes, there is limited ability to integrate illumination devices into the wing itself in order to project onto the fuselage facing side of the wingtip device. As such, in dark conditions, the logo and/or advertising on the wingtip device is not visible. In addition, because there is no structure outboard of the wingtip device, there is no component on which a lighting arrangement can be placed in order to project onto that side either.

It will be noted that logos and advertising on the vertical tail faces are illuminated by lighting systems positioned on the horizontal tail stabilisers. Because the vertical tail was integrated into the original airframe design, provision for illumination is made when the aircraft is designed in the first place. This is often not the case for wingtip devices which are integrated into the airframe when it is redesigned or upgraded. Furthermore, the solutions used for vertical tail plane illumination are not suitable for wingtips, not least because there is no structure on which to mount the illumination device outboard of the wingtip devices.

It is an object of the present invention to provide an apparatus capable of illumination of both the inward and outward facing sides of a wingtip device.

BRIEF SUMMARY OF THE INVENTION

According to the present invention there is provided an aircraft wing tip device assembly comprising a wing tip device defining a first end for attachment to a part of an aircraft wing, a second, free end and a lighting device arranged to project light onto a face of the wing tip device from a location proximate the second end.

Advantageously, provision of a lighting device within the wingtip device itself allows for illumination to be provided without design changes to the airframe outside of the wingtip (e.g. the wing).

Preferably, the lighting device comprises a light source and a light emission region, in which the light source is positioned remote from the light emission region, and light is transmitted from the light source to the light emission region along a light path.

The light source may be connected to the light emission region by a fibre optic cable defining the light path.

Alternatively, the light source is arranged to project light towards the light emission region.

Preferably, the lighting device comprises a reflector assembly in the light path to direct light from the light source towards the light emission region.

Preferably, the reflector assembly is configured to reflect the light by a total of 160 to 200 degrees.

Preferably, the light source is positioned proximate the first end of the wing tip device.

Preferably, the lighting device comprises a light source proximate the second end.

Preferably, the lighting device comprises an LED.

Preferably, the lighting device is a self-contained, powered lighting module which is removably installed in the wing tip device.

Preferably, an aerodynamically shaped glazing unit.

Preferably, the wing tip device defines a protrusion of the face, which protrusion is configured such that light from the lighting device projects at least partially from the protrusion back onto the face.

BRIEF DESCRIPTION OF THE SEVERAL VIEWS OF THE DRAWINGS

An example aircraft wingtip device assembly will now be described with reference to the accompanying figures in which.

DETAILED DESCRIPTION OF THE INVENTION

Figure 1:
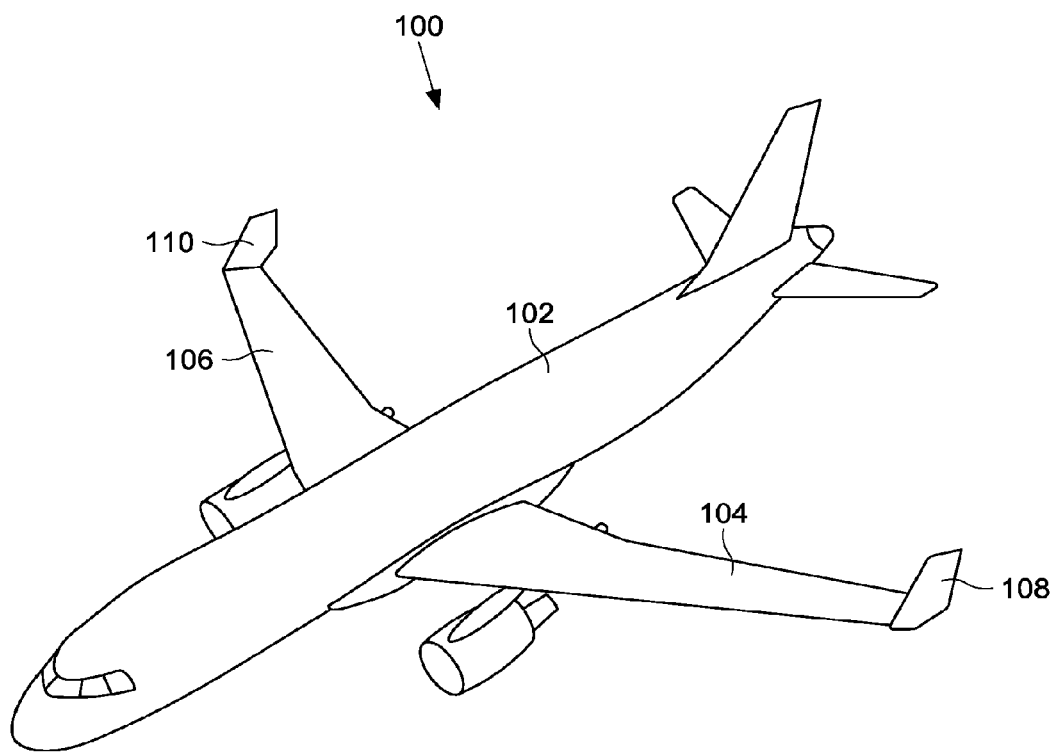
FIG. 1 is a perspective view of an aircraft comprising an aircraft wingtip device assembly according to the present invention.

Turning to FIG. 1, there is provided an aircraft 100 comprising a fuselage 102, a left wing 104 and a right wing 106. Each of the wings 104, 106 comprises a vertical wingtip device 108, 110 respectively.

Figure 2:
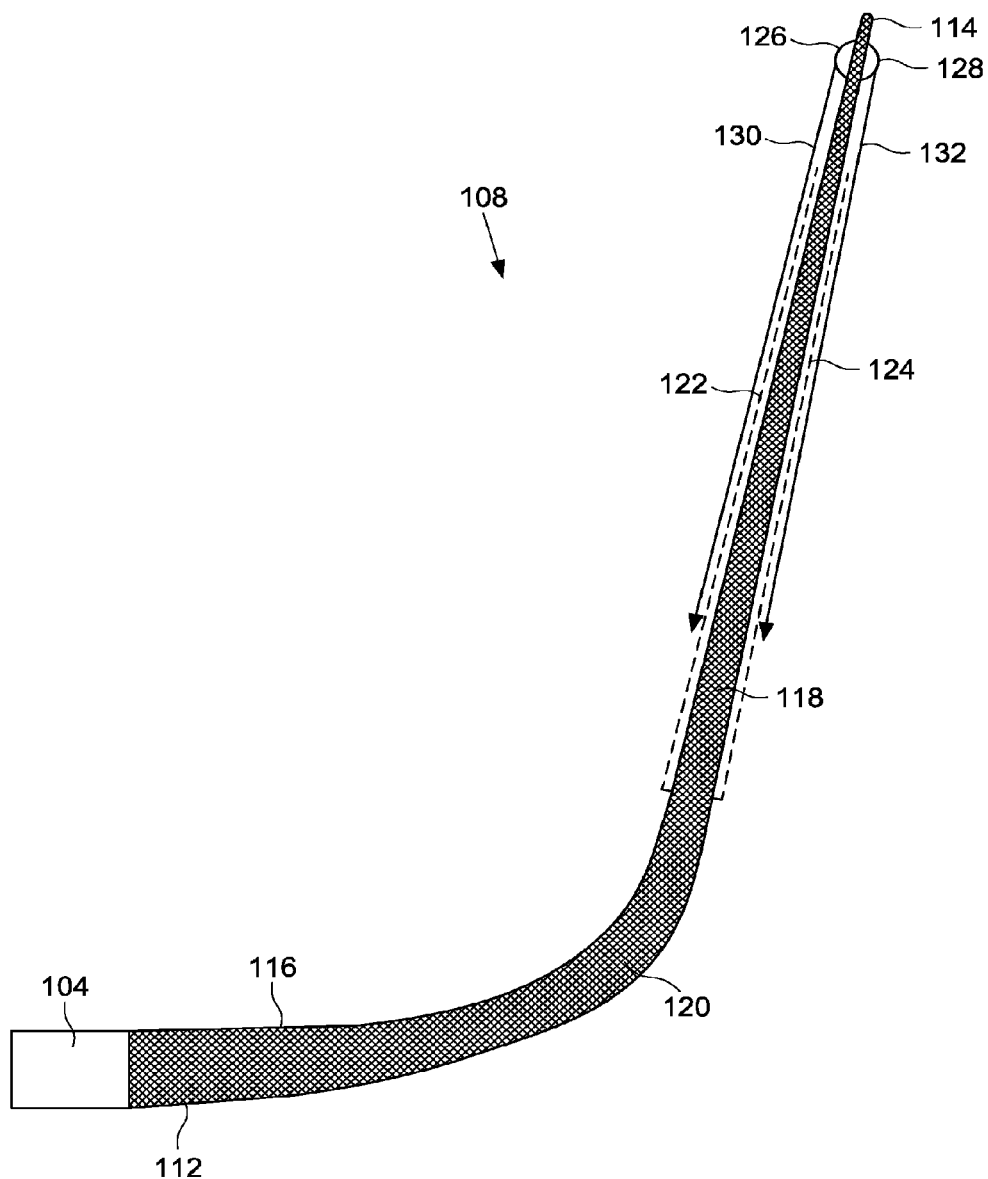
FIG. 2 is a front view of an aircraft wingtip device assembly in accordance with the present invention.

Turning to FIG. 2, the left-hand wingtip device 108 is shown from the front of the aircraft 100.

The wingtip device 108 comprises a first end 112 for attachment to the aircraft wing 104. The wingtip device 108 further comprises a second end 114 which is free. A horizontal region 116 proximate the first end 112 transitions into a vertical region 118 extending to the second end 114 via a curved region 120. The vertical region 118 has a fuselage facing or inward face 122 and an opposite outward face 124, which faces away from the fuselage 102. Aircraft logos and/or advertising are printed on the faces 122, 124.

A first protrusion 126 which is generally hemispherical, projects from the inward face 122 proximate the second end 114 of the wingtip device 108. A second protrusion 128 which is also generally hemispherical projects from the outward face 124 proximate the second end 114 and generally opposite the first protrusion 126. The protrusions 126, 128 are at least partially glazed and are part of a lighting device (not shown) which projects light 130 back down the faces 122, 124 and generally inclined towards the faces 122, 124.

Figure 3:
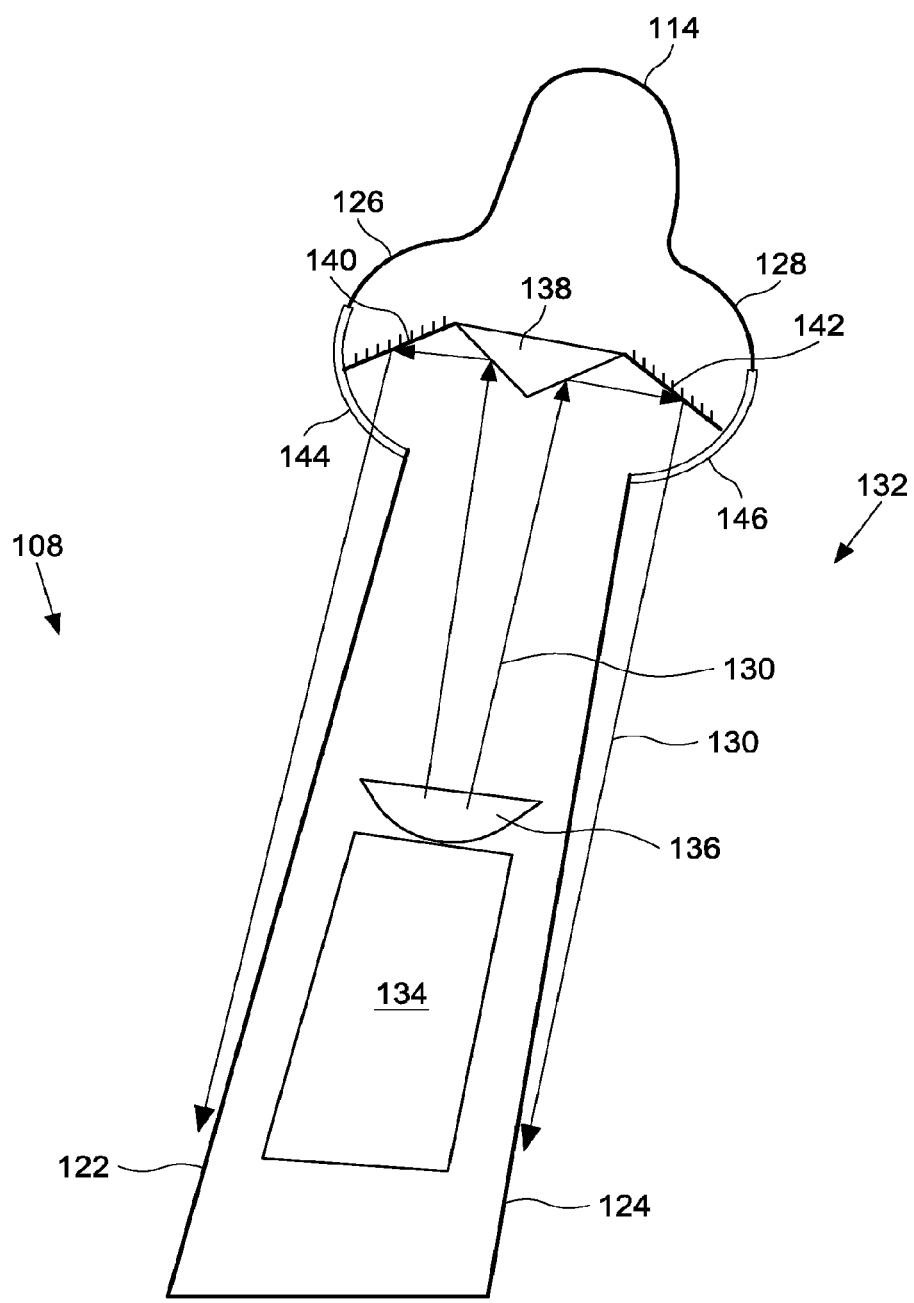
FIG. 3 is a section view through the aircraft wingtip device assembly of FIG. 2.

Turning to FIG. 3, a first internal scheme for the lighting device is shown.

Referring to FIG. 3, a lighting device 132 comprises an electronics pack 134 comprising a power supply, a heat sink and control circuitry. An LED lamp array 136 is positioned above the electronics pack 134 and arranged to direct light 130 towards a prism 138. The prism 138 is arranged to split and reflect the light 130 through 90 degrees onto a first mirror 140 and a second mirror 142, which mirrors protect the light 130 back down in the general direction of the LED lamp arrangement 136. The minors 140, 142 are positioned partially within the first protrusion 126 and the second protrusion 128 respectively.

Either of the protrusions 126, 128 comprises a quarter-spherical glazing portion 144, 146 respectively such that light can pass through. The glazing portions 144, 146 form the bottom part of the protrusions 126, 128 and allow light to be directed from the mirrors 140, 142 down towards the surfaces 122, 144 of the wingtip device 108.

It will be noted that the electronics pack 134 and the LED lamp arrangement 136 can be positioned at an appropriate point within the wingtip device 108 where the internal structure allows. In fact, they can be positioned proximate the first end 112 if desired.

Figure 4:
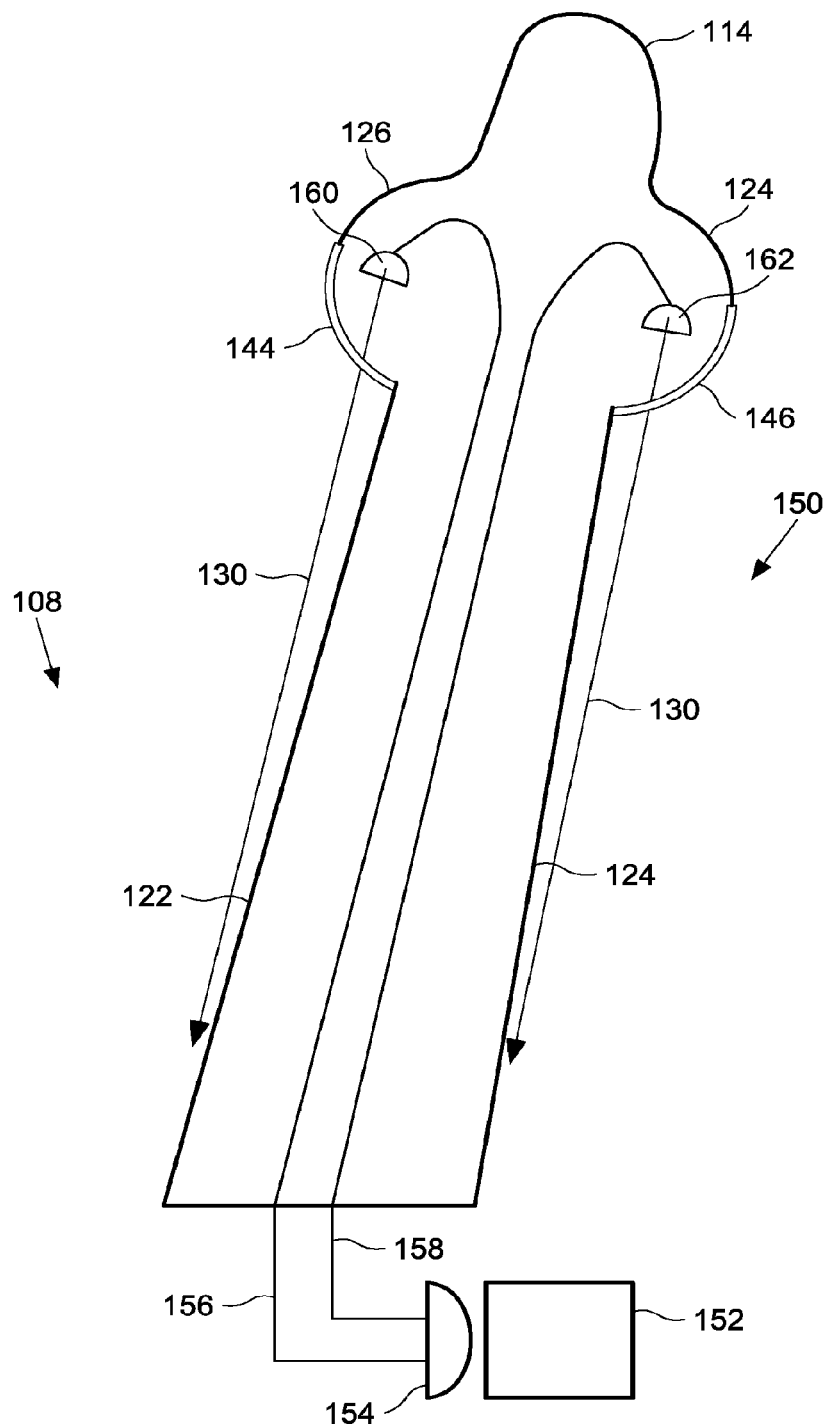
FIG. 4 is a section view through a second aircraft wingtip device assembly in accordance with the present invention.

Turning to FIG. 4, there is shown an alternative lighting device 150 installed in the wingtip device 108. Similar components are numbered identically. The lighting device 150 comprises an electronics pack 152 positioned remote from the second end 114 of the wingtip device 108. An LED lighting array 154 is connected to a first fibre optic cable 156 and a second fibre optic cable 158. The cables 156, 158 are passed up through the body of the wingtip device 108 and are connected at their other ends to light heads 160, 162. The light heads 160, 162 are arranged to project downwardly through the glazing 144, 146 back towards the surfaces 122, 124.

It will be noted that because fibre optic cables are used, the electronics pack 152 and the LEDs 154 can be positioned remote from the second end 114 so as not to get in the way of any structural components within the wingtip device 108.

The invention claimed is:

1. An aircraft wing tip device assembly comprising:
   a wing tip device defining:
      a first end for attachment to a part of an aircraft wing,
      a second, free, end, and,
      a lighting device arranged to project light onto a face of the wing tip device from a location proximate the second end.

2. An aircraft wing tip device according to claim 1 in which the lighting device comprises a light source and a light emission region, in which the light source is positioned remote from the light emission region, and light is transmitted from the light source to the light emission region along a light path.

3. An aircraft wing tip device according to claim 2 in which the light source is connected to the light emission region by a fibre optic cable defining the light path.

4. An aircraft wing tip device according to claim 2 in which the light source is arranged to project light towards the light emission region.

5. An aircraft wing tip device according to claim 4 in which the lighting device comprises a reflector assembly in the light path to direct light from the light source towards the light emission region.

6. An aircraft wing tip device according to claim 5 in which the reflector assembly is configured to reflect the light by a total of 160 to 200 degrees.

7. An aircraft wing tip device according to claim 2 in which the light source is positioned proximate the first end of the wing tip device.

8. An aircraft wing tip device according to claim 1 in which the lighting device comprises a light source proximate the second end.

9. An aircraft wing tip device according to claim 1 in which the lighting device comprises an LED.

10. An aircraft wing tip device according to claim 1 in which the lighting device is a self-contained, powered lighting module which is removably installed in the wing tip device.

11. An aircraft wing tip device according to claim 1 comprising an aerodynamically shaped glazing unit.

12. An aircraft wing tip device according to claim 1 in which the wing tip device defines a protrusion of the face, which protrusion is configured such that light from the lighting device projects at least partially from the protrusion back onto the face.

* * * * *